US006182124B1

(12) United States Patent
Lau et al.

(10) Patent No.: US 6,182,124 B1
(45) Date of Patent: Jan. 30, 2001

(54) TOKEN-BASED DEADLINE ENFORCEMENT SYSTEM FOR ELECTRONIC DOCUMENT SUBMISSION

(75) Inventors: Terence Chun-Yat Lau, North York; Jimmy Lo, Scarborough; Lev Mirlas, Thornhill, all of (CA)

(73) Assignee: International Business Machines Corporation, Armonk, NY (US)

( * ) Notice: Under 35 U.S.C. 154(b), the term of this patent shall be extended for 0 days.

(21) Appl. No.: 09/095,490

(22) Filed: Jun. 10, 1998

(30) Foreign Application Priority Data

Jan. 30, 1998 (CA) .................................................. 2228331

(51) Int. Cl.⁷ ........................... G06F 15/16; G06F 15/173
(52) U.S. Cl. ........................... 709/217; 709/218; 709/225; 709/227; 709/229; 705/37; 705/35; 705/235; 705/28; 705/26; 370/60.1; 370/232
(58) Field of Search .................................. 713/200, 202, 713/182, 183, 169, 158; 709/217, 218, 225, 227, 229; 705/28, 44, 26, 37, 235, 35; 370/60.1, 232; 380/23, 25; 368/3; 463/6, 12, 23, 25

(56) References Cited

U.S. PATENT DOCUMENTS

| | | | | |
|---|---|---|---|---|
| 4,903,201 | * | 2/1990 | Wagner | 705/37 |
| 5,073,931 | * | 12/1991 | Audebert et al. | 380/251 |
| 5,243,515 | * | 9/1993 | Lee | 705/37 |
| 5,535,276 | * | 7/1996 | Ganesan | 713/155 |
| 5,687,235 | * | 11/1997 | Perlman et al. | 713/158 |
| 5,727,165 | * | 3/1998 | Ordish et al. | 705/37 |
| 5,774,551 | * | 6/1998 | Wu et al. | 713/155 |
| 5,875,394 | * | 2/1999 | Daly et al. | 455/411 |
| 5,903,882 | * | 5/1999 | Asay et al. | 705/44 |
| 5,905,974 | * | 5/1999 | Fraser et al. | 705/37 |
| 5,917,897 | * | 6/1999 | Johnson et al. | 379/114 |
| 5,920,628 | * | 7/1999 | Indeck et al. | 360/25 |
| 6,021,398 | * | 2/2000 | Ausubel | 705/37 |
| 6,028,843 | * | 2/2000 | Delp et al. | 370/235 |

* cited by examiner

Primary Examiner—Zarni Maung
Assistant Examiner—Beatriz Prieto
(74) Attorney, Agent, or Firm—Gregory M. Doudnikoff

(57) ABSTRACT

In a token-based deadline enforcement system for electronic document submission, a submission requirements centre collects information on submission requirements (eg., deadlines for submitting bids in response to commercial tenders), from the processing environments that generate the requirements. A gateway to a network of potential submitters polls the information collected in the submission requirements centre, and generates tokens corresponding to current submission time limits. These tokens are available to all potential submitters until expiry of the corresponding time limit for the submission. On receiving a request for electronic submission from a submitting program, the gateway searches its records for the token corresponding to the submission type. If the token is located, it is returned to the submitting program for packaging with the submission. If the token is not located, an electronic message, such as an error flag, is returned to the submitting program, and the submitter knows immediately that the submission did not meet the deadline. When a submission packaged with a valid token is received at the gateway, it can be routed directly to the processing environment that generated the submission requirement. The valid token provides an on-time validity check; the receiving processing environment does not have to check the submission as it arrives to ensure that it has been filed on time, but can delay processing to a convenient time, to verify compliance with substantive requirements for filing the submission. This scheme provides the submitter with immediate feedback whether the submission has been accepted for filing within the deadline. Possible performance problems in trying to process "time of filing" for a large number of submissions filed virtually simultaneously as the submission deadline draws near, are avoided. Also, the submitter is saved network access costs in waiting for a verification of filing to be returned.

15 Claims, 7 Drawing Sheets

TOKEN-BASED DEADLINE ENFORCEMENT SYSTEM FOR ELECTRONIC DOCUMENT SUBMISSION

FIELD OF THE INVENTION

This invention is in the area of electronic information transmission, and provides a time-sensitive document submission system in which the submitter receives immediate verification whether the submission has been made in time.

BACKGROUND OF THE INVENTION

As the Internet becomes a more reliable and accepted transmission medium, it can be used for all types of information interchange.

For example, U.S. Pat. No. 5,694,546—Reisman describes a system for mass distribution by electronic transmission of information, such as periodicals. Using a current customer manifest, the server automates transmission of current issues and updates of the periodical information, and verifies with the customer that the transmission has been received in its entirety. Updating the customer's records can be totally automatic, or, as discussed in a preferred embodiment example in the patent, the customer's system clock can be monitored, and the customer alerted to the arrival of an update release date so that the customer can confirm that the system should seek and fetch the scheduled update, if available.

Another use of electronic transmission is for filing information to meet time deadlines. It is this use to which the present invention is directed.

An example of time-sensitive filing is commercial tenders. An invitation to tender electronically is usually not different from more traditional formats; a non-extendible submission deadline is set for receipt of sealed bids, and only those tenders filed by the deadline are considered.

Other examples of time-sensitive information submissions include:

applications for enrollment, submission of educational assignments and examinations, comments in response to requests for proposals, and purchase orders that must be received before expiry of a fiscal period.

By using electronic transmission to send information that is time-sensitive (as well as non-time sensitive information), the user is able to transmit, with certainty, the required information over a great distance in a short time, usually not exceeding a few hours. Compression technology permits lengthy documents to be sent. Encryption technology provides security where the information transmitted electronically is commercially sensitive or confidential.

Where the filing of a submission must meet a time limit or deadline, the receiving server cannot rely on the submitter's clock for controlling the submission gate because it is impossible to ensure the accuracy of the sender's clock, and, in a competitive situation, it is impossible to synchronize the clocks of all senders to ensure fairness.

However, the submitter usually wants to know as soon as possible whether a submission has met the time limit and been accepted for filing. There are a number of alternate techniques, known in the art, to try to return this type of information to the sender.

One technique is to enable the submitting application to try to check the date on-the-fly, while the submitter is still connected. However, this can be an expensive solution, particularly if database access is involved.

Another solution is to have the receiving processor check the submission at "submission time" to determine whether the document is on time, and to return a message to the submitter as soon as the check is complete. Implementing this solution requires that the processor receiving submissions filed to meet a deadline, have an active agent to respond to each submission at the time that document arrives. It is difficult to implement this technique universally because:

1. Some environments do not readily provide an active agent to immediately process documents on arrival; and 2. Some servers may not have the processing capability required for the actions of active agents, particularly where an invitation to tender is available to a wide constituency. As the deadline drew near, the volume of documents arriving could be huge. A scheme that requires active processing and checking of the arriving documents around that time would require corresponding "huge" performance from the processor. If the processor was able to process and respond on only some submissions, then the system would be unfair to submitters of those submissions that were missed by the processor.

If, in the above scheme, the receiving processor merely received and time stamped all documents for later checking for compliance with the deadline, the processing performance problem would be addressed, but no immediate feedback (deadline verification) would be provided to the submitter.

Another technique is to disable the receiving mechanism when the deadline arrives. However, this is extremely complex to implement because at the deadline time, there could be a huge backlog of files at different states and at different queues inside the system; some files being received, some awaiting "connection open", etc. The system may not have a clean way of allowing the receiving application to chop off a queue. If disabling the receiving mechanism must wait until all queues are clear, the waiting time could be very unpredictable as files kept coming in to re-fill the queues. The deadline would lose its definition, and would not be the same for all submissions.

Another alternative is to require a positive two-way handshake process between sender and receiver before the submitting program begins to file the submission, such as described in the above-referenced U.S. Pat. No. 5,694,546. As described in the patent, the protocol used for the handshaking is relatively complex; it identifies the customer's transporter client system to the remote server (that will issue the periodical information) by product ID and user ID, and a password or other authentication code for the transporter log file. This technique also requires an active agent on the receiver side, so that the performance problems discussed above associated with active agents at deadline time could result in added problems if processor performance prevented establishing the handshake, so that the submitting program could not make the submission at all.

It would be preferable to have a solution that did not depend on an active agent, such as discussed above, so that there would be no processing required for the documents when they arrive. Processing could then be scheduled and smoothed out, and the performance issue associated with the deadline in large bids would be alleviated. Yet, it is still desirable that a submitter has instant feedback about the result, that is, whether the submission has been accepted for filing within the time limit.

SUMMARY OF THE INVENTION

Therefore, it is an object of the present invention to provide a system in which a submitter is made aware immediately whether an electronic submission has been filed within the time requirement set for receiving submissions of that type.

It is also an object of the present invention to provide means to provide an on-time validity check for electronic submissions, to ensure that delayed delivery over the Internet does not cause a time deadline to be missed. It is also an object of the invention to provide a scheme in which the closing time applies to all submitters simultaneously so that the deadline is fair.

The proposed invention effectively implements a "universal clock" that provides an accurate "on-time" or "not on-time" reading quickly and efficiently, without requiring the server receiving the submissions to actually check its own clock every time a submission arrives. Thus, minimal active processing is-required at receiving time. This alleviates backlog and performance problem as the deadline approaches. Checking the substantive validity of the submission can be effectively delayed.

Accordingly, the present invention provides a method for enforcing time limits in an electronic filing system, in which a token corresponding to a current submission time limit is generated and maintained until expiry of the time limit. On receiving an electronic submission from a submitting program, a search is made for the token and, if the token is located, it is returned to the submitting program for packaging with the submission. If the token is not located, an electronic message, such as an error flag, is returned to the submitting program.

Preferably, when the electronic submission packaged with the token is received from the submitting program, it is routed to a processing environment setting the current submission time limit.

The present invention also provides a gateway mechanism for enforcing time limits for filing electronic submissions in a network. The gateway mechanism has means for receiving information related to a submission time limit from a submission processing environment and for generating a token that corresponds to the time limit information. The token generated in the gateway mechanism is accessible to all potential submitters under the submission time limit. The mechanism includes means for forwarding the token to a submitter in response to a submission filed within the submission time limit and for routing a submission packaged with a token to the submission processing environment. Means to remove access to the token on expiry of the submission time limit prevent filing of submissions after the time limit has expired.

The invention also provides a computer program product comprising a computer usable medium having computer readable program code means embodied therein for enforcing time limits in an electronic filing system.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1A:
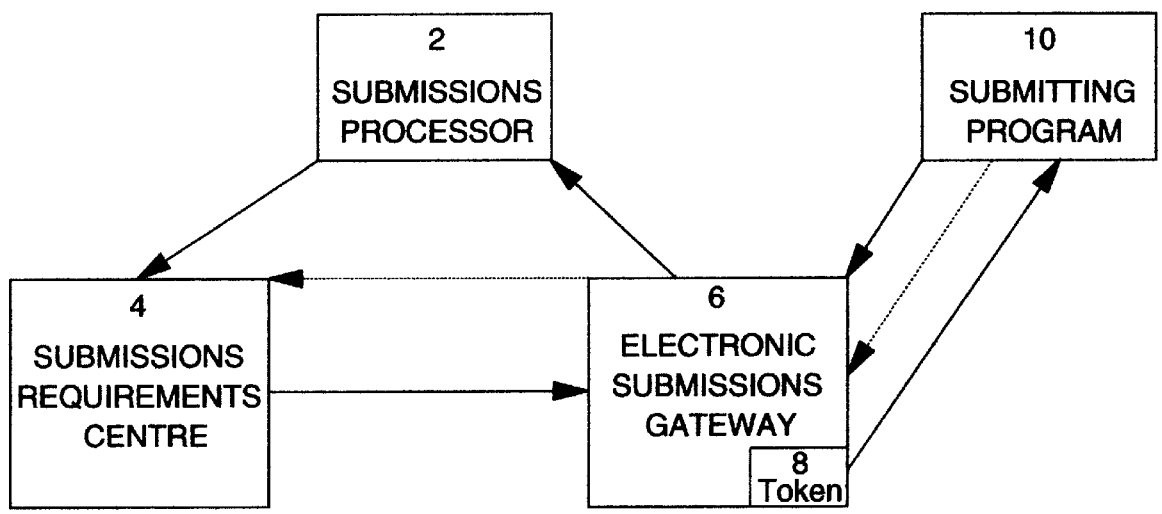
FIGS. 1A to 1C are schematic representations of a token-based submissions acceptance system, according to preferred embodiments of the invention.
Figure 1B:
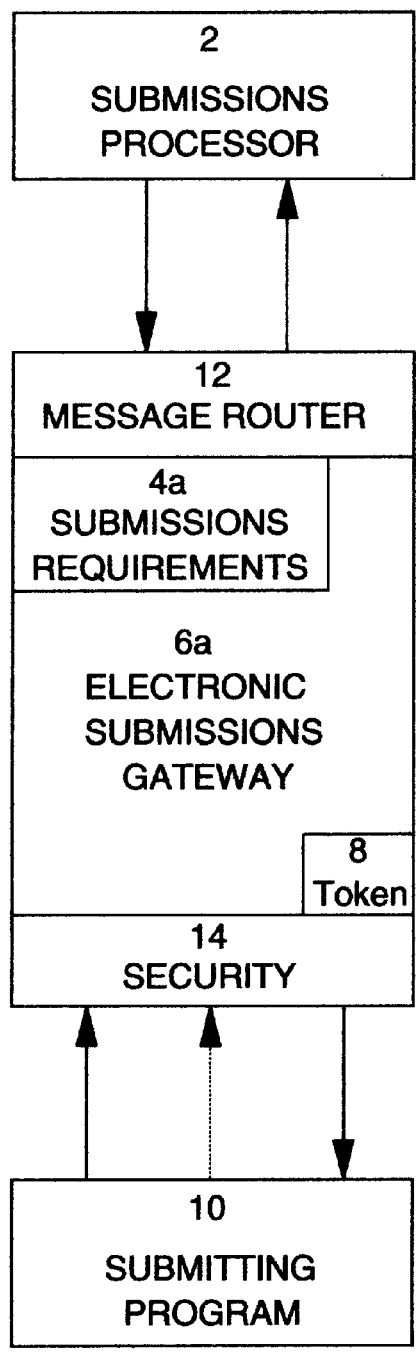
Figure 1C:
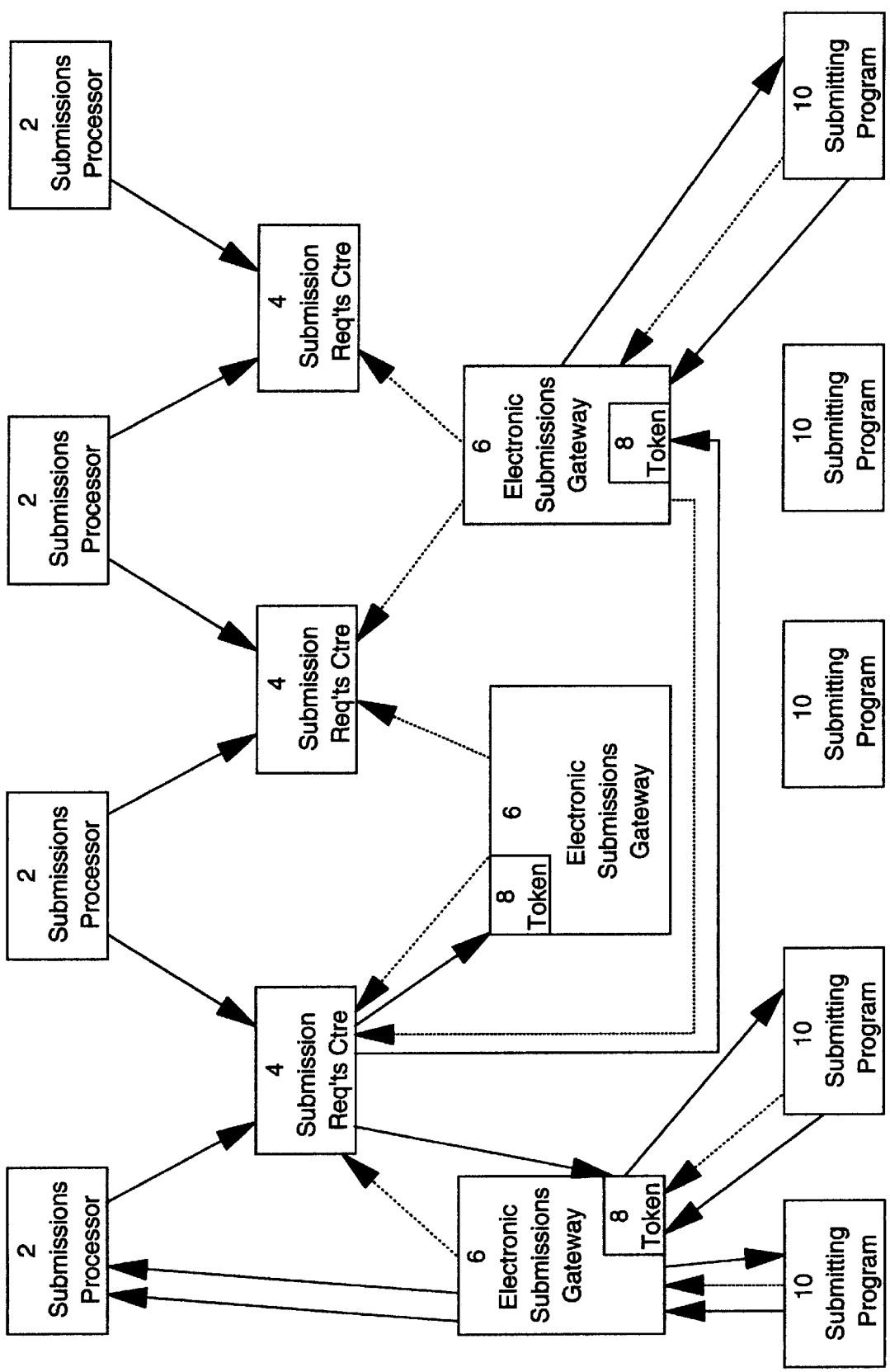

A token-based deadline enforcement system for electronic document submission, according to the invention, comprises the basic components illustrated schematically in FIG. 1. FIGS. 1A and 1B illustrate alternate simplified systems with a single representation of each component discussed in relation to the system; FIG. 1C illustrates a larger and more complex system of the same type.

Referring first to FIG. 1A, a Submissions Processor 2 is an entity that creates and generates the requirements for a submission, assigns the submission type and sets the deadline for receiving submissions intended to meet the requirements. The Submissions Processor 2 that creates the requirements for a particular submission type, is also the entity that receives the submissions filed to respond to the requirements, and processes those submissions, assuming that the submissions that reach it have been filed by the deadline.

The Submission Requirements Centre 4 is a server that collects information about all upcoming current submission requirements, the corresponding deadlines and the expected submission type, and makes this information available to another component called the Electronic Submissions Gateway 6.

The Electronic Submissions Gateway 6 is the server that interfaces directly with submitting programs 10 used by end users for filing their submissions. After the Gateway 6 determines that a submission came before the corresponding deadline, it routes the submission to the appropriate Submissions Processor 2.

FIG. 1B schematically illustrates an embodiment of the invention implemented for a commercial tendering system for a large organisation. The Submissions Processor 2 is a master buyer server operating under a Microsoft Windows NT® operating system to collect purchase requisitions from inside the organisation. The Electronics Submission Gateway 6a is a document information gateway operating under an IBM RS6000® operating system. In this embodiment, the Gateway 2a, itself, is the repository of information about current submission requirements from the Submission Processor 2. The Gateway 2a a Submission Requirements component 4a that interfaces directly with the Submissions Processor 2 to collect this information, and to make it available internally, to other components of the Gateway 6a. The Submission Requirements component 4a also includes a tender bulletin board, preferably on a secure website, to notify external parties (i.e., potential suppliers) of calls for tender. The potential suppliers make bid submissions to the system via submitting programs 10 operating on PC operating systems with network/Internet access, such as IBM OS/2® Warp, Microsoft Windows® 95, etc. Communications between the master buyer server/Submissions Processor 2 and Gateway 6a is handled by an OS/2 Message Router 12 located in the Gateway 6a. The Submissions Processor 2 automatically wraps outgoing messages and unwraps incoming messages in order to ensure data integrity. Similarly, the Message Router 12 automatically wraps and unwraps messages going to and from the Submissions Processor 2. Messages within the Gateway environment, for example from the Message Router 12 to the Submission Requirements component 4a or between the Submission Requirements component 4a and other components in the Gateway 6a, are not wrapped.

The Gateway 6a has a firewall that protects it from the external network. Communications with suppliers are handled by a security module 14 which automatically builds a secure structure before forwarding a message to a supplier over the network, and unpacks the secure structures it receives from the network in order to forward plain messages to other components in the Gateway 6a to process. The secure structure packages the token together with the submission in a single structure. If necessary, the application may use message digest, encryption, and digital signature technologies to assure integrity, privacy, authentication, and non-repudiation of submissions.

As FIG. 1C shows, the Submission Requirements Centre 4 can collect information on new requirements for multiple Submissions Processors 2, and can make those requirements available, in turn, to multiple Submissions Gateways 6. Similarly, each Electronic Submissions Gateway 6 can be responsible to poll multiple Submission Requirements Centres, provided that each Gateway 6 also has direct access (for the purpose of directing qualifying submissions) to all Submissions Processors creating requirements collected by the Submission Requirements Centres 4.

Figure 2:
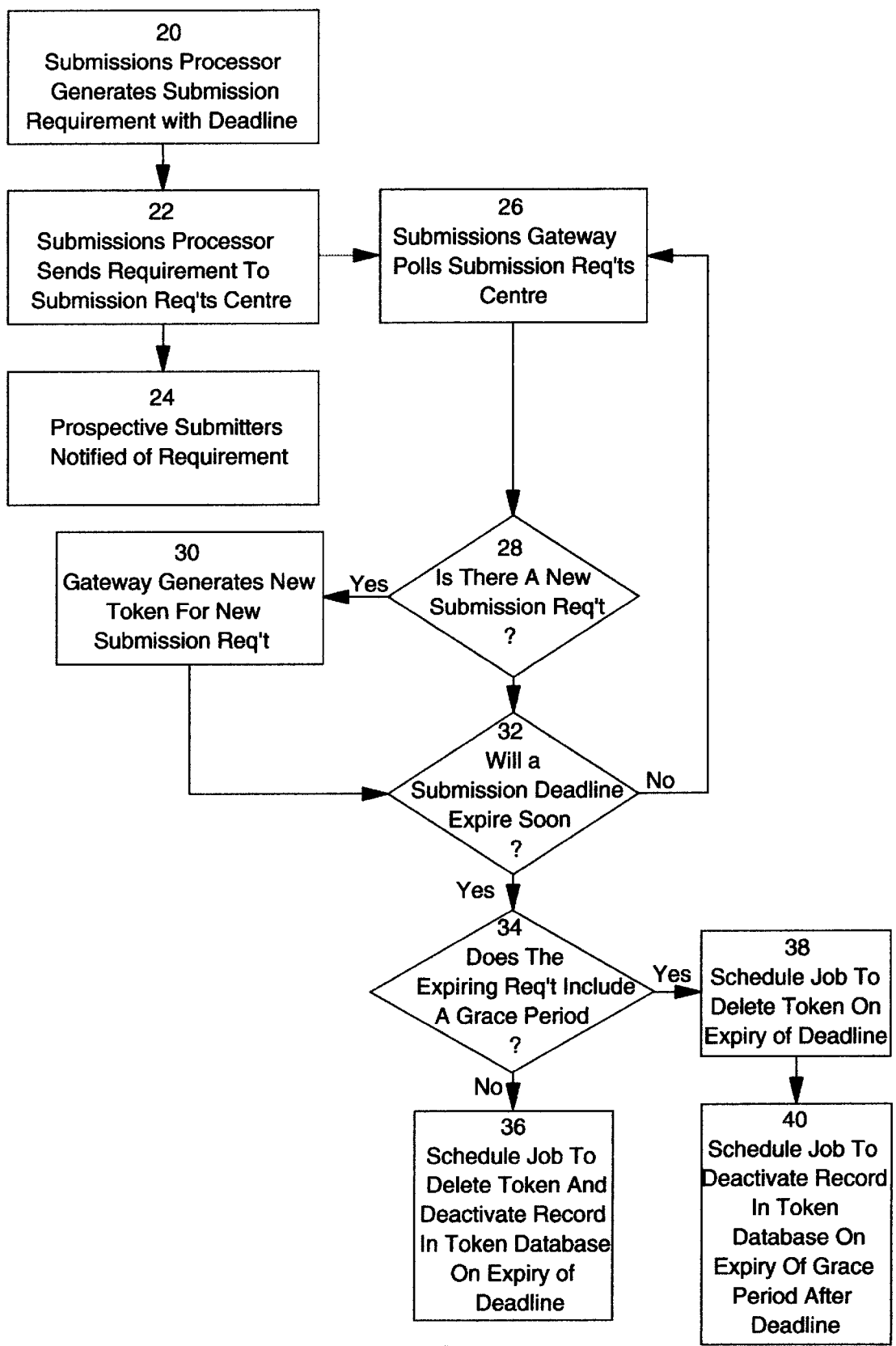
FIG. 2 is a flow diagram setting forth the steps for token creation, to correspond with a new submission requirement deadline, and token removal when the corresponding submission requirement deadline has expired, according to the invention.

Submission requirements (deadlines, etc.) are created and managed, according to a preferred embodiment of the invention, following the steps set forth in the flow diagram of FIG. 2.

A Submissions Processor generates a submission requirement and sets the deadline for accepting submissions that respond (block 20). Submission requirements generated by the Submissions Processor can include altering existing deadlines (shortening or extending them) and withdrawing existing submission requirements, as well as creating entirely new submission requirements.

The Submissions Processor then sends the requirement to the Submissions Requirements Centre (block 22), and affected parties are notified of the requirement (block 24). In the case of the posting of a new submission requirement at the Submission Requirements Centre, the notification would invite prospective submitters to send in submissions. The type of notification used will depend upon the type of submissions sought. In the case of a commercial tender, the notification could include advertising in print media and on websites.

The Electronic Submissions Gateway polls the Submission Requirements Centre to check for new submission requirements and for changes to existing requirements created by Submissions Processors (block 26). Unless the Gateway has access to the notification of a new submission requirements sent out by the Processor, the Gateway won't know when a new submission requirement has become available. In that case, the Gateway would poll the Submission Requirements Centre constantly or at frequent intervals, to ensure that a new requirement is not missed for very long.

In response to determining that a new submission requirement has been created (block 28), the Gateway generates a token corresponding to the new requirement (block 30). In FIG. 1, the token 8 generated in the Gateway 6 is made available to all submitters. Preferably, the token is encrypted with a secret key known only to the Submissions Gateway, to prevent submitters from tampering with it. The token can be encrypted using techniques well known in the art.

Returning to FIG. 2, the polling of the Submission Requirements Centre performed by the Gateway also checks for deadlines on existing submission requirements that are about to expire or that have been withdrawn by the Submissions Processor (block 32). At the time a deadline expires, its corresponding token in the Gateway must be made unavailable to all submitters. For this, access privileges may be revoked or the token may be deleted altogether.

In the method of the preferred embodiment set out in FIG. 2, when the Gateway discovers the impending expiry of a requirements deadline, it schedules a future job or process to delete the corresponding token on expiry of the deadline, and to deactivate the token record in the Gateway's token database (block 36). Thus, deadline expiry affects all submitters simultaneously. Regardless of the multi-processing capabilities of the server running the Gateway, all submitters will discover that the deadline has expired through the simple fact of token availability.

In some circumstances, there may be a grace period associated with a deadline. This is discussed in more detail below.

Figure 3:
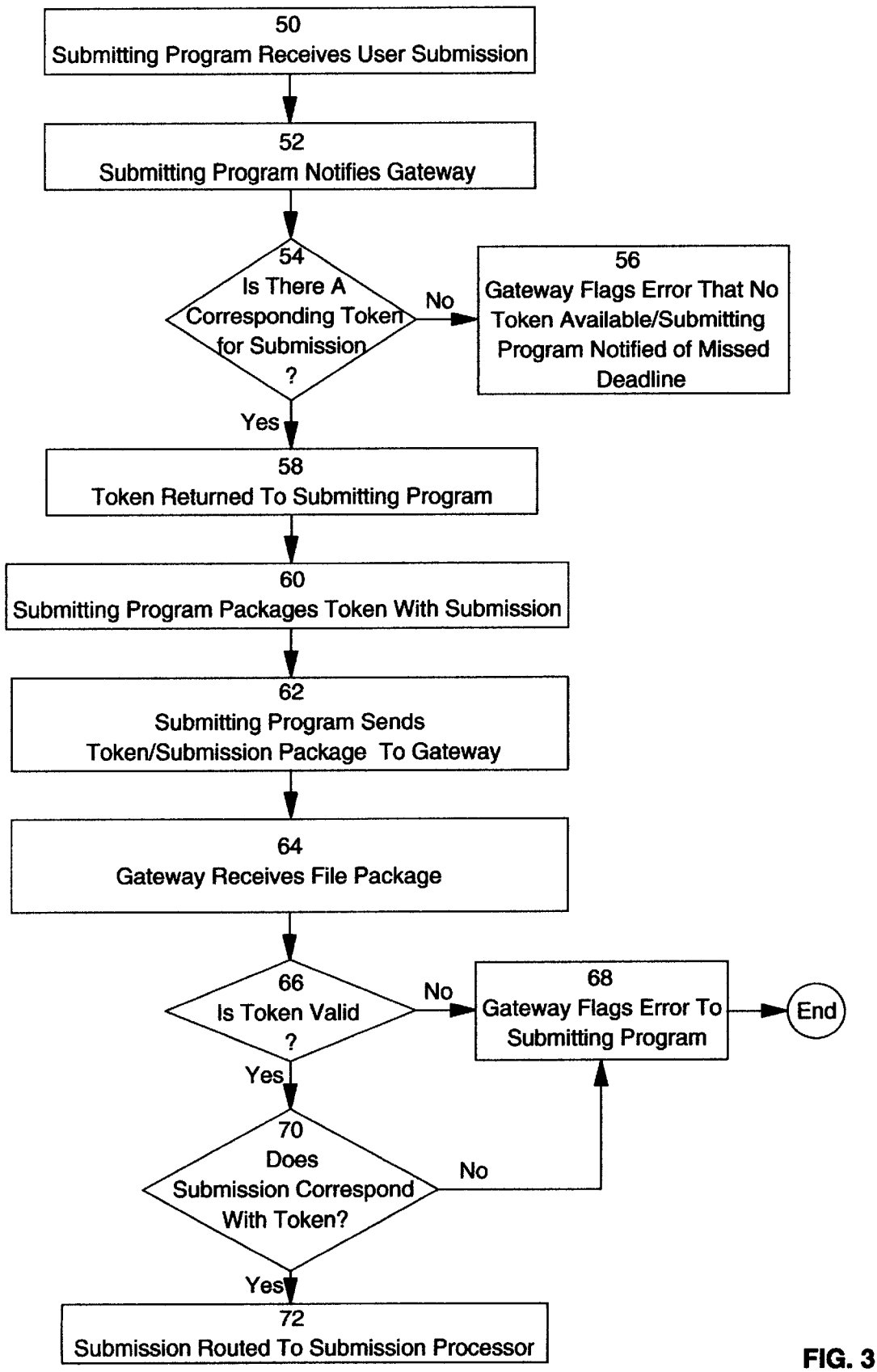
FIG. 3 is a flow diagram setting forth the steps for providing token-based verification to a submitter, according to the invention.

FIG. 3 is a flow diagram illustrating the process followed to notify a submitter whether a submission filed in the system of the invention has met the deadline set by the Submission Processor that created the requirements.

After an end user prepares a submission, a submitting program is used to file the submission in the system (block 50). The submitting program must send the submission to the Electronic Submissions Gateway, which will, in turn, route the submissions to the Submissions Processor. To send the submission, the submitting program must first notify the Gateway of a complete submission (block 52) and obtain a corresponding token for the submission (block 54). If the token is not available, the submitting program receives an error message from the Gateway making it clear that the submission missed the deadline (block 56).

If the token is available, it is returned to the submitting program (block 58). The submitting program packages the token together with the submission (block 60), and sends the packaged file to the Submissions Gateway (block 62). To avoid misuse of the token, the system should impose a requirement that the packaging of the token with the submission must be performed immediately by the submitting program. For example, the program creating the token could cause the token to be discarded, by "zeroing it out", if it is not used immediately.

The Electronic Submissions Gateway receives the package from the submitting program (block 64) and first checks to determine if the token is valid and corresponds to a submission requirement whose deadline has not expired (block 66).

It is possible that the deadline can expire after the Gateway issues the token to the submitting program, but before the submitting program can package the token with the submission and return the package to the Gateway, particularly if the returning package is delayed due to network congestion. Therefore, to account for propagation delays, a fixed size grace period, that is long enough to allow for network and electronic processing delays, is provided in the preferred embodiment. During the grace period, submissions continue to be accepted, even though the corresponding submission deadline has expired. After the grace period has expired following a deadline, no more submissions may be accepted for the corresponding requirements.

One way in which observance of a grace period could be implemented in the system of the present invention, is shown in FIG. 2. Where an expiring requirement includes a grace period (block 34), the Gateway schedules a future job to delete only the token on expiry of the deadline (block 38), without deactivating the token record in the token database. The Gateway schedules the job to deactivate the record to execute on expiry of the grace period (block 40). Then, tokens will no longer be available to submitters on expiry of the deadline, but submissions legitimately packaged with tokens can continue to be accepted and checked at the Electronic Submissions Gateway up to expiry of the grace period.

Returning to FIG. 3, if the token packaged with the submission is valid, an additional check can be performed to see if the submission carries within it the corresponding requirements (block 70). In this case, the submission can be compared with the ticket that accompanies it, to ensure that the two correspond.

Examples of situations resulting in submission check failure at the Gateway can include the following:

the submission is not accompanied by a ticket, the ticket accompanying the submission is not valid, the ticket accompanying the submission does not correspond to a valid requirement, the deadline corresponding to the ticket has expired, including any grace period.

When a submission check at the Gateway fails, it is flagged as an error (block 68), and the end user is immediately aware that the submission has not been accepted for filing.

If the submission passes all checks, it is routed to the correct Submission Processor that created the requirements for the submission (block 72).

Figure 4:
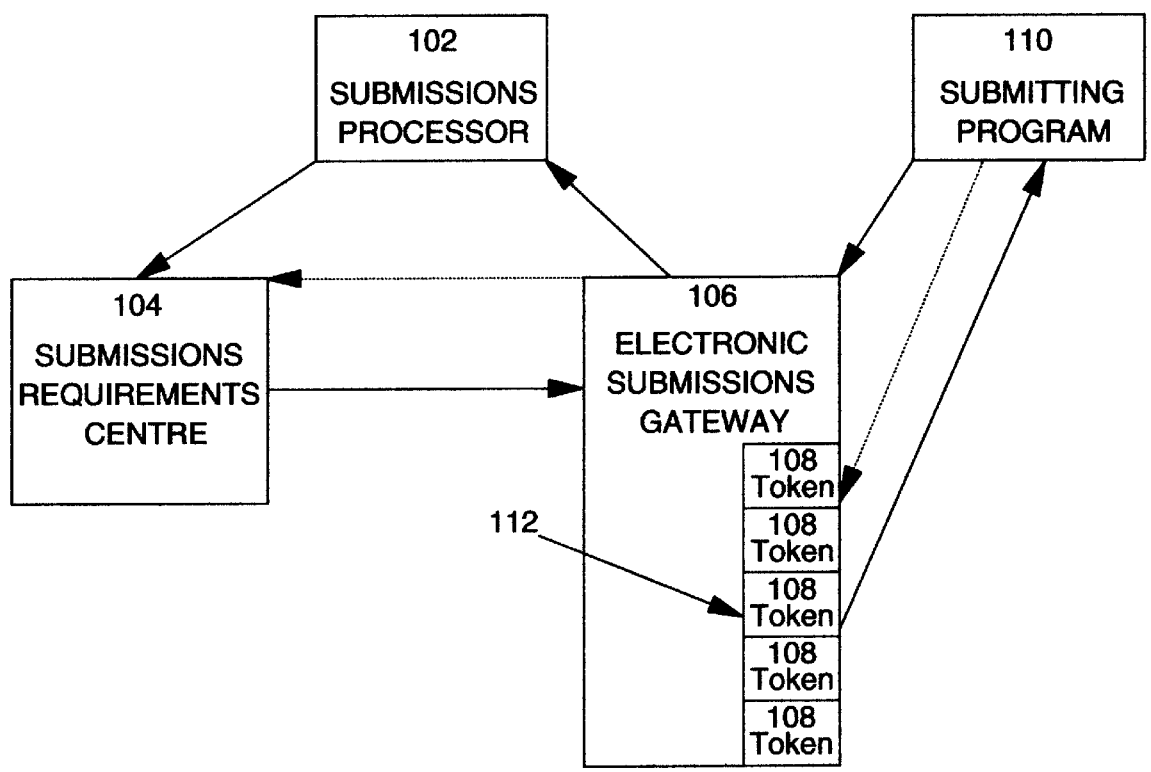
FIG. 4 is a schematic diagram, similar to FIG. 1A, setting forth a further embodiment of the invention for submissions filed using File Transfer Protocol (FTP)
Figure 5:
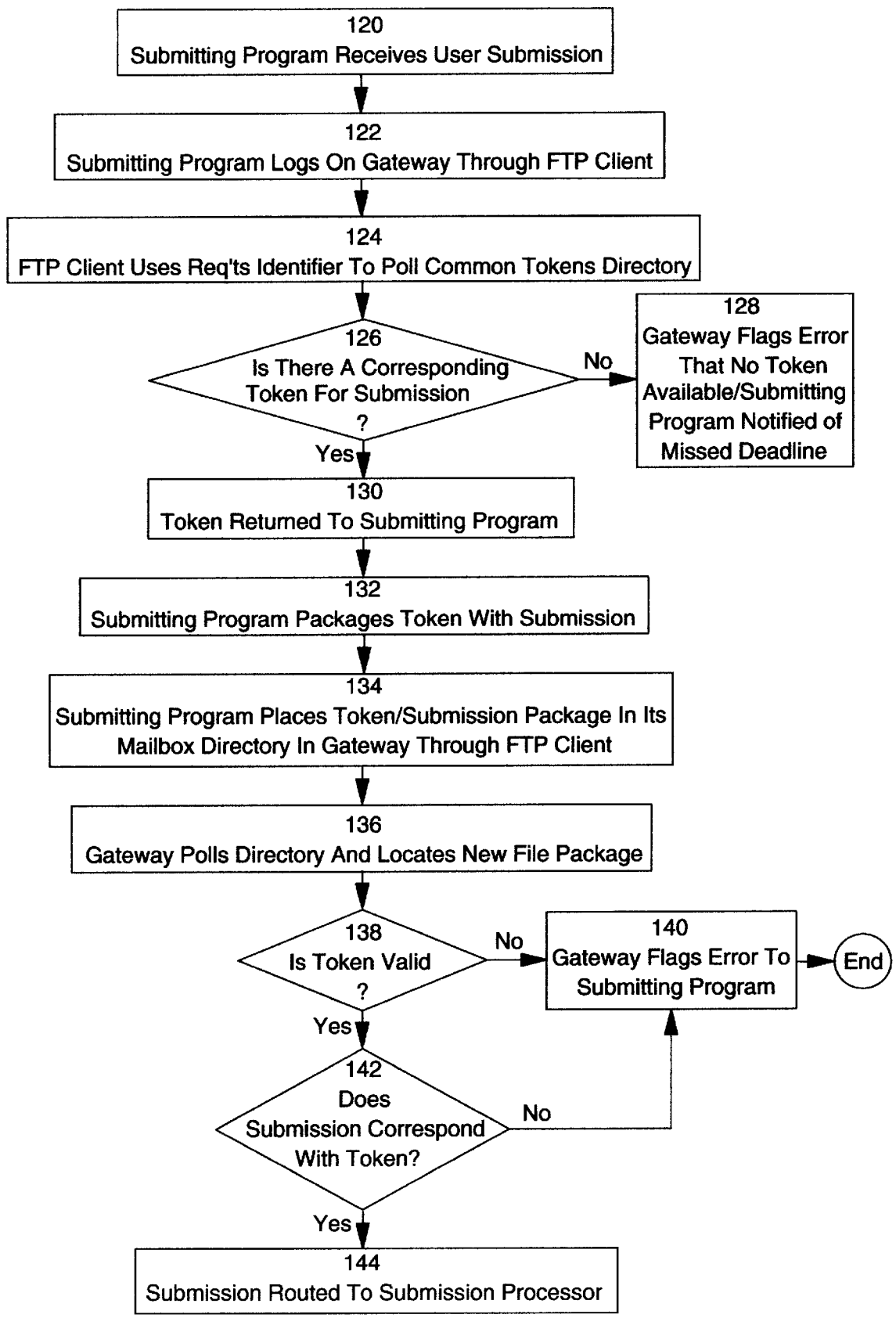
FIG. 5 is a flow diagram, similar to FIG. 3, setting forth the steps for providing token-based verification to a submitter in the system embodiment of the invention illustrated in FIG. 4.

The invention can also be implemented using File Transfer Protocol (FTP), and a preferred embodiment is illustrated in FIGS. 4 and 5, and discussed below.

FTP is a protocol used to transfer files over TCP/IP networks, such as the Internet, between machines. In this protocol, a client contacts the FTP server on the target machine, and after logon the client may transfer files to/from the target machine. The advantage of FTP is that this protocol has been widely implemented on many operating systems. FTP clients are available in many programming environments, which allows submitter applications to be written on many platforms. Another advantage of FTP is that all that is required from an operating systems is to support any kind of a file system; the client's file system and operating system may however be completely different from the server's file system and operating system.

The system components illustrated in FIG. 4 are essentially the same as those illustrated in FIG. 1. The difference is that when a new submission requirement is published by the Submissions Processor 102 on the Submission Requirements Centre 104, the Submissions Gateway 106 creates a token 108 corresponding to the new submission requirement and places it in a well-known directory 112, so that every submitter 110 can have access to it. In this FTP implementation, the token is a physical file, which resides in an area which is accessible by all submitters. The file name is derived from the requirements number, so that the submitting program can determine which token file corresponds to the given submission. Placing the token in the file system makes the former easily and efficiently accessible by all submitters. As illustrated in FIG. 4, the directory 112 is mounted in the Electronic Submissions Gateway 106. In reality, the directory could be located in a different physical location, but the Gateway 106 would be unaware of this.

When a Submitting Program has a submission to send in to a Submissions Processor, the steps set out in FIG. 5 are followed.

The Submitting Program receives a user submission (block 120), and uses an FTP client to log on to the Electronic Submissions Gateway (block 122). The FTP client uses the requirements identifier to poll the common token directory (block 124) to locate a corresponding token for the submission (block 126). This can be done either by passing the token file name as part of the submission requirement, or the token file name can be deterministically generated from the requirements number, if available.

If there is no corresponding token, an error will be flagged to the Submitting Program through the FTP client making it clear that the submission missed the deadline (block 128). If a corresponding token is available, it is returned to the Submitting Program (block 130) through the FTP client. The Submitting Program packages the token with the submission document into a single submissions package (block 132), and puts the file in its mailbox in the Gateway directory using the same FTP client as above (block 134).

When the Gateway locates the new submission package file by periodically polling its directory (block 136), it checks the token to see that it is valid and still open for submissions using the same techniques described above in relation to FIG. 3 (blocks 138, 140, 142).

If the submission package meets all checks at the Gateway, the Gateway routes the package to the appropriate Submissions Processor (block 144).

Embodiments of the invention that would be obvious to the person skilled in the art are intended to be included within the scope of the appended claims.

What is claimed is:

1. A method for enforcing time limits in an electronic filing system, comprising:

generating a token corresponding to a current submission time limit and maintaining said token until expiry of the time limit; and on receiving a request for perrnission to submit an electronic submission from a submitting program, searching for the token and, if the token is located, returning the token to the submitting program for packaging with the submission, else, returning an electronic message to the submitting program.

2. The method as set forth in claim 1, further comprising:

on receiving the electronic submission packaged with the token from the submitting program, routing said electronic submission packaged with the token to a processing environment setting the current submission time limit.

3. The method as set forth in claim 1, further comprising:

on receiving the electronic submission packaged with the token from the submitting program, verifying validity of the token and, if valid, routing said electronic submission packaged with the token to a processing environment setting the current submission time limit, else, returning an error message to the submitting program.

4. The method as set forth in claim 3, wherein the step of verifying validity of the token comprises verifying non-expiry of the time limit as extended by any associated grace period.

5. The method as set forth in claim 1, wherein the step of generating and maintaining the token comprises obtaining notification of expiry of the time limit, the method further comprising scheduling a process to delete the token on expiry of the time limit.

6. The method as set forth in claim 1, wherein in the step of searching for the token, returning an electronic message to the submitting program comprises returning an error flag to the submitting program.

7. The method as set forth in claim 1, wherein in the step of searching for the token, returning an electronic message to the submitting program comprises returning the submission to the program without the token.

8. In a network, a gateway mechanism for enforcing time limits for filing electronic submissions, comprising:

means for receiving information related to a submission time limit from a submission processing environment and for generating a token corresponding thereto, said token being accessible to all potential submitters under the submission time limit;

means for forwarding the token to a submitter in response to a submission filed within the submission time limit;

means for removing access to the token on expiry of the submission time limit; and means for routing a submission packaged with the token to the submission processing environment.

9. The mechanism, according to claim 8, wherein the means for receiving information related to a time limit from a submission processing environment comprises:

a submission repository adapted to receive information related to current submission requirements from the submission processing environment; and means to poll the submission repository to update the submission time limit.

10. The mechanism, according to claim 8, wherein the means for removing access to the token on expiry of the submission deadline comprises means for deleting the token on expiry of the time limit.

11. The mechanism, according to claim 10, wherein the means for generating the token further comprise creating a record for the token in the gateway mechanism, and wherein the means for deleting the token further comprise means for deactivating the record for the token on expiry of a grace period after expiry of the time limit.

12. The mechanism, according to claim 8, wherein the means for removing access to the token on expiry of the submission deadline comprises means for returning an error message in response to submissions filed after the submission time limit.

13. The mechanism, according to claim 8, wherein the means for routing a submission packaged with a token to the submission processing environment further comprises:

means for verifying the validity of the token; and if the token is invalid, means for aborting a route of the submission processing environment and returning an error message to the submitter.

14. The mechanism, according to claim 13, wherein the means for routing a submission packaged with a token to the submission processing environment further comprises:

means to compare the submission with the token to match the submission with the information related to the time limit; and if no match is found, means for aborting a route of the submission to the submission processing environment and returning an error message to the submitter.

15. A computer program product comprising a computer usable medium having computer readable program code means embodied therein for enforcing time limits in an electronic filing system, the computer readable program product comprising:

computer readable program code means for causing a computer to generate a token corresponding to a current submission time limit and to maintain said token until expiry of the time limit; and computer readable program code means for causing the computer to search for the token on receiving an electronic submission from a submitting program, and, if the token is located, for causing the computer to return the token to the submitting program for packaging with the submission, or else, to return an electronic message to the submitting program.

\* \* \* \* \*